United States Patent Office 3,492,141
Patented Jan. 27, 1970

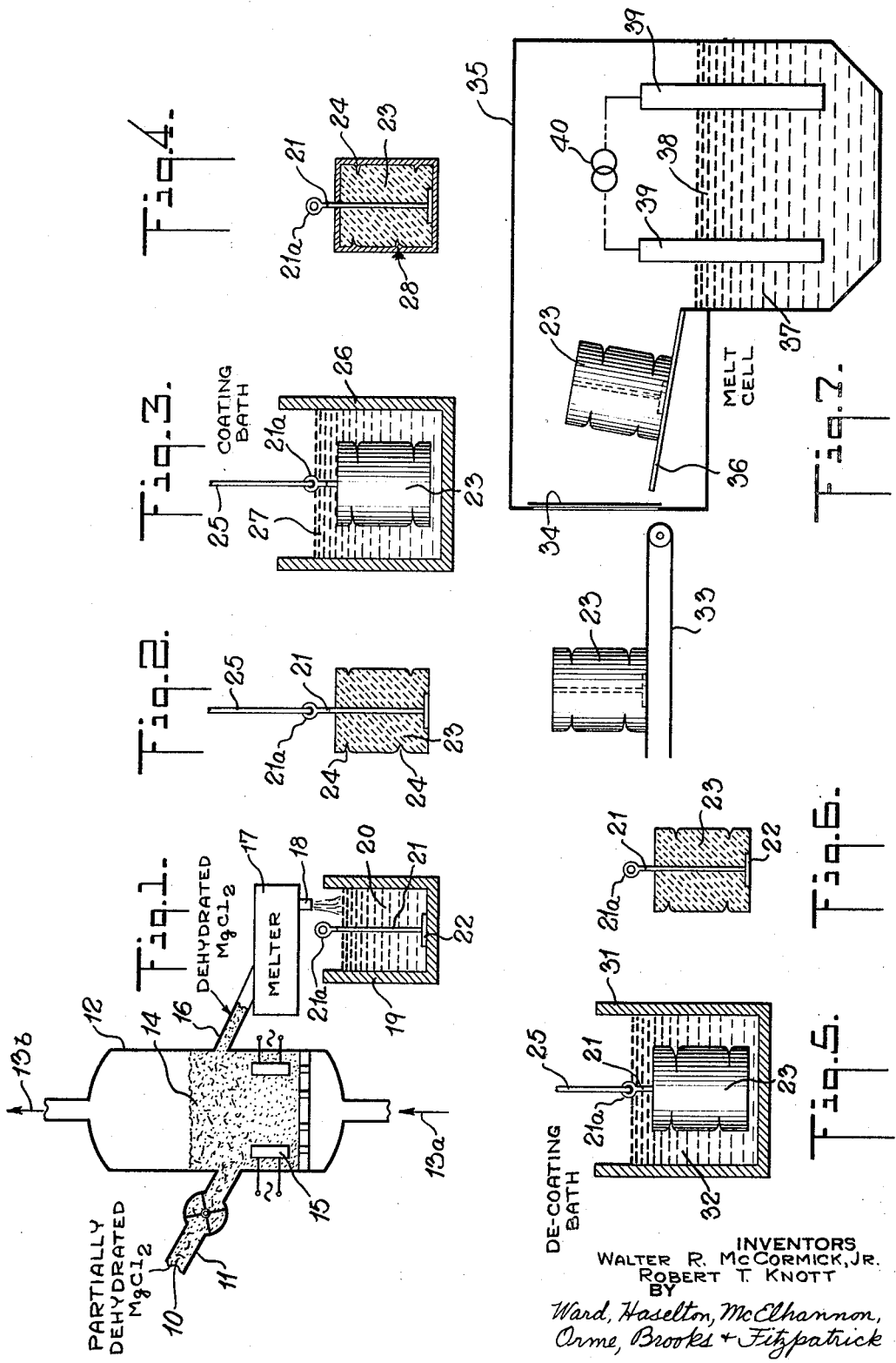

3,492,141
CAST AND FUSED BLOCK OF HYGROSCOPIC SALT COATED WITH A WAX AND AN ETHYLENE-VINYL ACETATE COPOLYMER
Walter R. McCormick, Jr., and Robert T. Knott, Las Vegas, Nev., assignors to National Lead Company, New York, N.Y., a corporation of New Jersey
Filed Nov. 30, 1966, Ser. No. 603,081
Int. Cl. B44d 1/06; C09d 3/76
U.S. Cl. 117—6
4 Claims

ABSTRACT OF THE DISCLOSURE

Cast and fused blocks of a hygroscopic salt encased in a coating composition comprising paraffin wax and an ethylene-vinyl acetate copolymer in proportions of about 90 to 70% by weight of said wax and 10 to 30% by weight of said copolymer and wherein said copolymer contains about 17 to 42% by weight of vinyl acetate and has a melt index of 2.1 to 465.

---

This invention pertains to coating compositions for imperviously coating hygroscopic salts and the like and to coated articles thereof, and more particularly to a coating composition therefor such as may be easily applied, as by hot dipping, which may thereafter be similarly easily removed, which as applied is sufficiently flowable to flow around sharp corners of an article to be coated but nevertheless sufficiently viscous to bridge over gaps and crevices of the article, and which as applied forms a tough and impenetrable coating completely encasing the article.

Storage of hygroscopic inorganic salts has been a problem in the chemical processing industry due to the large losses encountered in wet or humid weather. Basically these commodities are of relatively low value which precludes the use of protected storage areas or other standard packaging procedures. In some applications the loss of material is greater than the calculated value based on the percent moisture pickup. For instance in the electrolysis of magnesium chloride containing water of hydration the total loss can run as high as about 5% for each 1% of water. In addition to the economics, these hygroscopic salts create unsightly and unsafe conditions where water of hydration is absorbed. In addition water of hydration present in cakes or cast blocks of such salts may result in explosive forces in certain subsequent processing steps as described below by liberation of steam and/or hydrogen.

Successful solution of the problem of providing a suitable protective coating on cakes or cast blocks of hygroscopic salts is far from obvious owing to the numerous requirements to be met. The coating composition and its application must be relatively cheap due to the relatively low value of the salts. The coating applied must in general be easily removable with little expense in order to render the salt cakes or blocks available for use. The coating must be tough and impervious over long periods of exposure, and such as to withstand the hazards of handling and shipment. As applied it must be sufficiently flowable completely to encase the article with a coating of controllable thickness, but must nevertheless be sufficiently viscous to bridge small cracks, shrinkage crevices and the like of salts cast into cakes or blocks from the molten state.

Paraffin wax although a cheap coating material and one easily applied as by hot dipping, is wholly unsuitable for coating cast cakes or blocks of hygroscopic salts. The coating is easily marred, scraped off or otherwise removed in normal handling and shipment. As applied, as by hot dipping, it lacks sufficient viscosity to bridge gaps or crevices in salt cakes such as results from cooling of castings thereof from the molten state.

We have discovered, however, as the result of exhaustive investigation that by blending paraffin wax with certain synthetic organic polymers miscible therewith and in appropriate proportions, that a coating composition is obtained which meets all the requirements above-stated. We have found a blend of paraffin wax and ethylene-vinyl acetate copolymer to be most suitable, such as that produced in accordance with U.S. Patent 2,200,429, and put out by Du Pont under its tradename "Elvax" in various grades, the vinyl acetate content of which may range from about 17 to 42% by weight of the total, with a corresponding "melt index" of about 2.1 to 465 grams/10 minutes as determined by ASTM D 1238–57 T. This copolymer is compatible with melted paraffin. We have found that by varying the relative proportions of the wax and this copolymer, that a coating composition is obtained which is extremely tough and such as to bridge over cracks and crevices in the salt cakes while nevertheless being sufficiently flowable in the molten state to flow about and coat all portions thereof in a continuous coating. The proportions of our coating composition found to be most suitable comprise about 10 to 30% by weight of the ethylene-vinyl acetate copolymer with about 90 to 70% by weight of paraffin wax and wherein the copolymer contains about 27 to 29% by weight of vinyl acetate. The paraffin thus employed may have a melting point varying from about 143 to 200° F., and preferably about 143 to 165° F. A preferred coating composition is that containing about 15% copolymer with 85% wax and a relatively low melt index of about 5–18.

The necessity for employing a coating composition of sufficient viscosity to bridge over cracks and fissures of salt cakes cast from the molten state, results from the fact that as the cakes are cooled, the coefficient of contraction of the liquidus and solidus phases produced by interaction, stress cracks in the surface of the solidified cake. This effect can be somewhat minimized by casting into cylindrical molds.

Another problem encountered in the protection of hygroscopic salt cakes resides in the matter of how the cakes are to be handled during the coating operation and also subsequently to minimize abuse to the coating, particularly as applied to large and heavy cakes. This problem is solved in accordance with a further aspect of the invention by casting the cake with a lifting rod embedded and anchored therein, by means of which the cake may be raised, moved and lowered into position. The cast cake is of sufficient solidity to have the requisite structural strength for such handling, and yet the salt does not adhere to the lifting rod sufficiently to prevent its easy removal prior to the consumption of the salt. To this end the lifting rod with a small base plate welded on the bottom is equipped with a threaded lifting eye on the top and disposed in the mold prior to casting and the molten salt cast thereabout. When ready for removal, the lifting eye is unscrewed from the lifting rod and the two removed, leaving the salt cake ready for consumption and the lifting rod assembly ready for reuse.

When ready for use the salt cakes can be decoated by dipping into hot paraffin to melt the coating.

In the coating of salt cakes in accordance with the invention, basically three variables exist, namely, the temperature of the coating bath, the temperature of the cake and the characteristics of the bath. The cakes can of course be preheated to a suitable temperature prior to dipping, but this is not required since ambient temperature thereof suffices. With the bath of the composition above stated, these two variables become fixed so that the coating thickness depends on the bath temperature. A good operating temperature range for the coating bath is about 153 to 310° F.

The invention finds particular application in the processing of hydrated magnesium chloride into anhydrous magnesium chloride and thence into magnesium metal and chlorine as described in the copending applications of L. R. Lyons et al., Ser. No. 433,141, filed Feb. 16, 1965, now Patent No. 3,338,668, and F. E. Love, Ser. No. 556,108, filed June 8, 1966, now Patent No. 3,418,223, of common ownership with the instant application.

In the accompanying drawing, FIGS. 1 to 7, inc., illustrate diagrammatically the sequence of steps according to this invention in passing from the final dehydrating stage of the process of the first above-mentioned application to the first stage of the process of the last above-mentioned application.

Referring to the drawing, partially dehydrated magnesium chloride is fed, as at 10, through a downwardly inclined chute 11 into a final stage dehydrator 12 traversed by hydrochloric acid gas of low moisture content, as at 13a, 13b, which flows through a fluidized bed 14 of the partially dehydrated magnesium chloride, the dehydrator being heated to an appropriate temperature by electrically heated resistance coils, as at 15. The substantially completely dehydrated magnesium chloride flows out of the dehydrator 12 through a downwardly inclined chute 16 and into a melting unit 17, wherein it is rendered molten and flows out through a tap hole 18 into a cylindrical mold 19, as at 20. Positioned in upstanding manner in the mold is a lifting rod 21 welded at its base to a base plate 22 which seats on the bottom of the mold. Threaded into the upper end of the lifting rod 21 is a lifting eye 21a. When the mold is filled with the dehydrated molten salt, it is moved aside and replaced by another mold and the contents of the first mold allowed to cool and solidify.

Referring to FIG. 2, the resulting solidified cast dehydrated magnesium chloride cake 23, is then stripped from the mold by means of its lifting rod 21 and eye 21a. During the cooling of the cake 23 from the molten state, shrinkage cracks or crevices appear therein, as at 24. The cake 23 is then lifted by means of a crane-actuated lifting rod 25 linked to the lifting eye 21a, over to the position of FIG. 3, wherein is disposed a coating tank 26 filled with a molten bath 27 of the coating composition above-stated. The cake 23 is lowered into this bath until fully immersed and then withdrawn and moved to the position of FIG. 4 for storage, at which time the lifting rod 25 is disconnected from the eye 21a. As shown in FIG. 4, the cake 23 is now completely coated with a thin outer coating 28 of the coating composition.

When the cake 23 is ready for use the crane-actuated lifting rod 25 is again linked to eye 21a and the cake moved over to the decoating station shown in FIG. 5, at which is disposed a tank 31 filled with molten paraffin wax, as at 32, into which the coated cake 23 is lowered for dissolving and removing the coating as shown. The cake is then withdrawn from the bath and moved to the position of FIG. 6, whereat the lifting eye 21a is unscrewed and the rod and plate assembly 21, 22, withdrawn.

The cake 23 is now ready for use and to this end is lifted onto an endless conveyor belt 33 and moved through a double door 34 of a housing 35 onto a downwardly-inclined chute 36 within the housing, as shown by the position of the cake 23 therein whereby the cake slides downwardly into a melt cell 37. The melt cell contains a molten bath of the dehydrated magnesium chloride salt, as at 38, wherein the cake 23 is melted to form part of the bath, by means of the immersed electrodes 39 energized from an alternating current source 40, preparatory to electrolysis of the salt to convert it into its constituents magnesium metal and chlorine gas, respectively.

As an alternative decoating procedure to that above-described, the step of decoating the coated cake by immersion in the melt bath 32 may be omitted, and the coated cakes transferred directly from storage, FIG. 4, directly onto the conveyor belt 33 and fed thence into the housing 35 and onto chute 36 and thence into the melt cell 37. In the melt cell the composition is burned off.

In the appended claims where reference is made to "melt index" is meant that determined in accordance with ASTM D 1238–67 T.

We claim:

1. A cast and fused block of a hygroscopic salt encased in a coating of a composition comprising paraffin wax and an ethylene-vinyl acetate copolymer in proportions such as to provide a moisture impervious and water insoluble coating at ambient temperatures and of sufficient toughness and strength substantially to prevent rending of the coating and exposure of the salt during handling and shipment, said coating composition being sufficiently fluid in the molten state to flow about and coat all portions of said cast block while remaining sufficiently viscous to bridge over gaps and crevices thereof, said coating being removable by immersion of said coated block in molten paraffin wax, and said coating composition comprising about 90 to 70% by weight of said wax and 10 to 30% of said copolymer and wherein said copolymer contains about 17 to 42% by weight of vinyl acetate and has a melt index of about 2.1 to 465.

2. A coated article according to claim 1 wherein said copolymer contains about 27 to 29% by weight of vinyl acetate and wherein said paraffin wax has a melting point of about 143 to 165° F.

3. A coated article according to claim 1 comprising about 15% by weight of said copolymer and 85% of said wax and having a melt index of about 5–18.

4. An article according to claim 1 of substantially cylindrical contour.

References Cited

UNITED STATES PATENTS 2,413,491  12/1946  Fajans _____ 23—103
3,372,019   3/1968  Fox _____ 117—100 X WILLIAM D. MARTIN, Primary Examiner T. G. DAVIS, Assistant Examiner U.S. Cl. X.R.
117—161, 168